(12) United States Patent
Wu et al.

(10) Patent No.: US 11,977,543 B2
(45) Date of Patent: May 7, 2024

(54) METADATA GENERATING SYSTEM AND METADATA GENERATING METHOD

(71) Applicants: Digiwin Software Co., Ltd, Shanghai (CN); DATA SYSTEMS CONSULTING CO., LTD., New Taipei (TW)

(72) Inventors: Kuan-Hui Wu, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 73 days.

(21) Appl. No.: 17/839,491

(22) Filed: Jun. 14, 2022

(65) Prior Publication Data

US 2023/0350886 A1    Nov. 2, 2023

(30) Foreign Application Priority Data

Apr. 27, 2022   (CN) .......................... 202210449717.9

(51) Int. Cl.
*G06F 16/245*    (2019.01)
*G06F 16/215*    (2019.01)
*G06F 16/23*     (2019.01)

(52) U.S. Cl.
CPC .......... *G06F 16/245* (2019.01); *G06F 16/215* (2019.01); *G06F 16/23* (2019.01)

(58) Field of Classification Search
CPC ....... G06F 16/245; G06F 16/215; G06F 16/23
See application file for complete search history.

(56) References Cited

U.S. PATENT DOCUMENTS

| | | | |
|---|---|---|---|
| 7,730,011 B1* | 6/2010 | Deninger ................ | G06F 16/38 709/224 |
| 8,176,049 B2* | 5/2012 | Deninger ............ | H04L 63/1408 709/224 |
| 8,417,715 B1* | 4/2013 | Bruckhaus ............. | G06Q 10/04 705/26.1 |
| 11,501,061 B2* | 11/2022 | Foncubierta Rodriguez ............... | G06F 40/253 |
| 2014/0129457 A1* | 5/2014 | Peeler .................. | G06Q 30/018 705/317 |
| 2017/0004124 A1* | 1/2017 | Kyre ..................... | G06F 40/205 |
| 2017/0017683 A1* | 1/2017 | Fourny ................... | G06F 16/22 |
| 2022/0206993 A1* | 6/2022 | Layton .................. | G06F 16/122 |

* cited by examiner

*Primary Examiner* — Angelica Ruiz
(74) *Attorney, Agent, or Firm* — JCIPRNET

(57) ABSTRACT

The disclosure provides a metadata generating system and a metadata generating method. The metadata generating system includes a storage device and a processor. The storage device stores a data acquisition module and a data analysis module. The processor is coupled to the storage device. The processor executes the data acquisition module to perform data acquisition on the original data and obtain the first data. The processor executes the data analysis module to analyze the first data and generate the second data. The data analysis module performs sample comparison on the second data to generate metadata.

14 Claims, 3 Drawing Sheets

METADATA GENERATING SYSTEM AND METADATA GENERATING METHOD

CROSS-REFERENCE TO RELATED APPLICATION

This application claims the priority benefit of China application serial no. 202210449717.9, filed on Apr. 27, 2022. The entirety of the above-mentioned patent application is hereby incorporated by reference herein and made a part of this specification.

BACKGROUND

Field of the Disclosure

The disclosure relates to a data generating technology, in particular to a metadata generating system and a metadata generating method.

DESCRIPTION OF RELATED ART

When performing data sorting, the existing method of establishing metadata is to make judgment based on human knowledge and experience after the data is observed by the personnel. In other words, the conventional metadata generating process has to be checked and reviewed by personnel before the setting is completed. However, there are thousands or hundreds of charts and fields in the face of data inventory in the enterprise, and there might be tens of millions of data. When dealing with a large amount of data, it is impossible for data inventory personnel to review all the data before formulating standard. The conventional method is to sample part of the data and formulate metadata according to the sampling results, so errors occur very often.

SUMMARY OF THE DISCLOSURE

The present disclosure is directed to a metadata generating system and a metadata generating method that can automatically generate metadata.

According to an embodiment of the present disclosure, the metadata generating system of the present disclosure includes a storage device and a processor. The storage device stores a data acquisition module and a data analysis module. The processor is coupled to the storage device. The processor executes the data acquisition module to perform data acquisition on the original data and obtain the first data. The processor executes the data analysis module to analyze the first data and generate the second data. The data analysis module performs sample comparison on the second data to generate metadata.

According to an embodiment of the present disclosure, the metadata generating method of the present disclosure includes the following steps: performing data acquisition on original data through a data acquisition module, and obtaining first data; analyzing the first data through a data analysis module, and generating second data; and performing sample comparison on the second data through the data analysis module to generate metadata.

Based on the above, the metadata generating system and metadata generating method of the present disclosure will automatically analyze the original data, and perform sample comparison (pattern comparison) to automatically classify and effectively generate corresponding metadata.

In order to make the above-mentioned features and advantages of the present disclosure more understandable, the following embodiments are given and described in detail with the accompanying drawings as follows.

DESCRIPTION OF EMBODIMENTS

Figure 1:
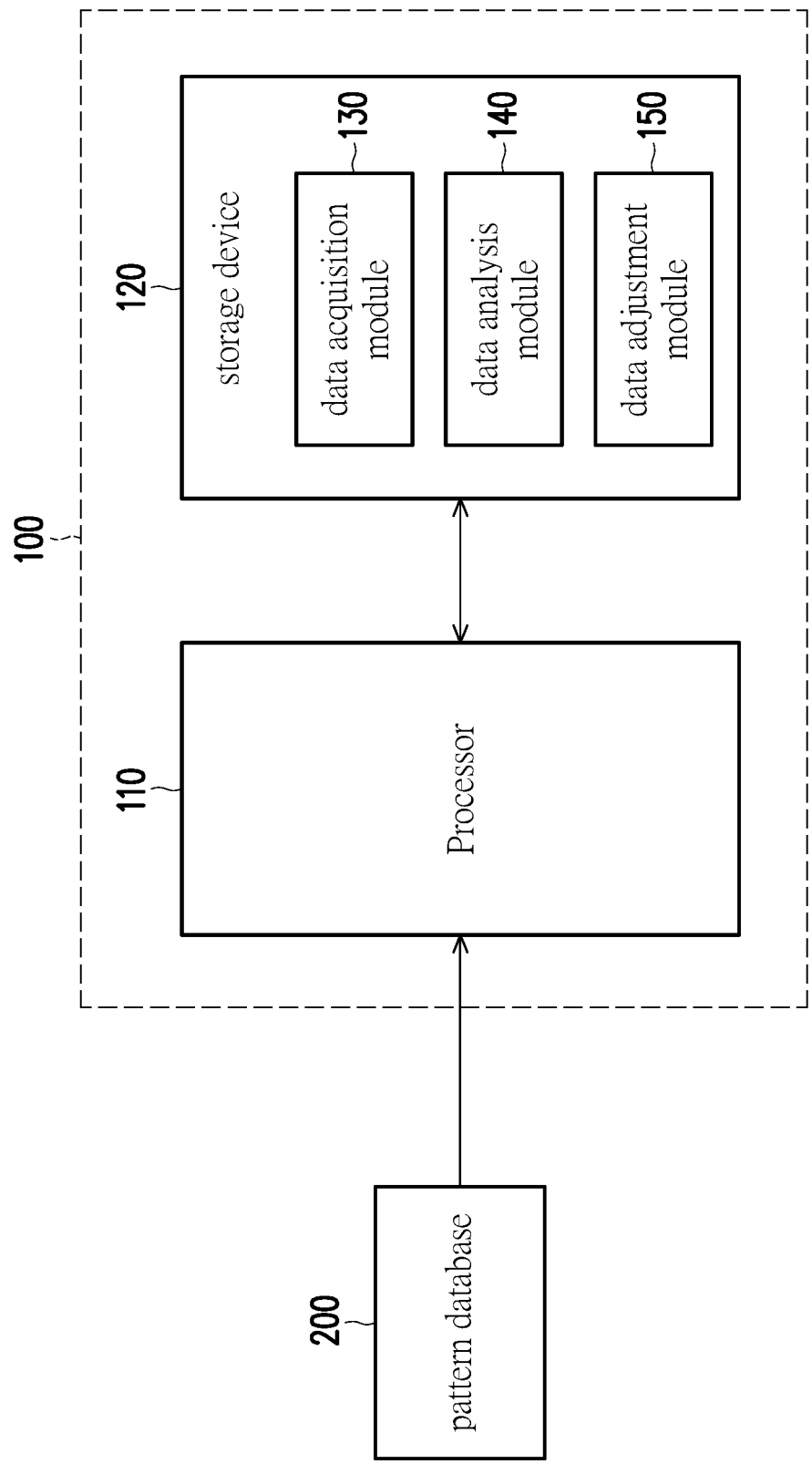
FIG. 1 is a schematic view of a metadata generating system according to an embodiment of the present disclosure.

Reference will now be made in detail to the exemplary embodiments of the present disclosure, examples of which are illustrated in the accompanying drawings. Wherever possible, the same reference numerals are used in the drawings and description to refer to the same or similar parts.

FIG. 1 is a schematic view of a metadata generating system according to an embodiment of the present disclosure. Referring to FIG. 1, the metadata generating system 100 includes a processor 110 and a storage device 120. The processor 110 is coupled to the storage device 120. The storage device 120 may store a data acquisition module 130, a data analysis module 140 and a data adjustment module 150. The processor 110 may also be coupled to an external or internal pattern database 200. The processor 110 may access the storage device 120 to execute the data acquisition module 130, the data analysis module 140 and the data adjustment module 150. In this embodiment, a piece of pre-stored original data may be input by a personnel or automatically read by the processor 110, and the data acquisition module 130 may perform data acquisition on the original data. The data analysis module 140 may analyze the data acquisition results of the original data, and use the pattern database 200 to perform data comparison to automatically generate metadata. In addition, the processor 110 may output the metadata to the human computer interaction interface, and the human computer interaction interface may provide corresponding adjustment instructions to the processor 110 according to the adjustment result of adjusting the metadata, so that the data adjustment module 150 may adjust the metadata according to the adjustment instruction to generate the adjusted metadata. In an embodiment, the adjustment instruction may also be automatically generated or preset by the processor 110.

In this embodiment, the processor 110 may include, for example, a central processing unit (CPU), or other programmable general-purpose or special-purpose microprocessors, digital signal processors (DSP), application-specific integrated circuits (ASIC), programmable logic devices (PLD), other similar processing circuits or a combination of these devices. The storage device 120 may include a memory and/or a database, and the memory may be, for example, a non-volatile memory (NVM). The storage device 120 may store related programs, modules, systems or algorithms for implementing the embodiments of the present disclosure, so that the processor 110 can access and execute them to implement the related functions and operations described in the embodiments of the present disclosure. In this embodiment, the data acquisition module 130, the data analysis module 140 and the data adjustment module 150 may be, for example, implemented in a programming language such as JSON (JavaScript Object Notation), Extensible Markup Language (XML), or YAML or the like, but the present disclosure is not limited thereto. In this embodiment, the metadata generating system 100 may be specifically implemented in a personal computer (PC), a local server or a cloud server, but the present disclosure is not limited thereto. In an embodiment, the metadata generating system 100 may also be integrated into an enterprise resource planning (ERP) system to provide a service for automatically generating metadata.

Figure 2:
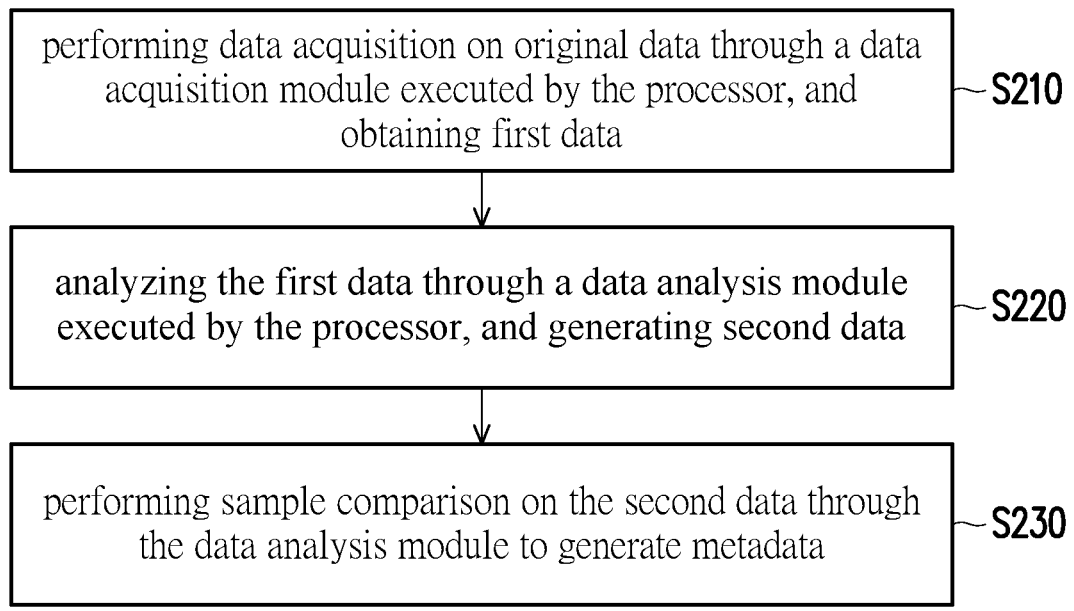
FIG. 2 is a schematic view of a metadata generating method according to an embodiment of the present disclosure.

FIG. 2 is a flowchart of a method for generating metadata according to an embodiment of the present disclosure. Referring to FIG. 1 and FIG. 2, the metadata generating system 100 of this embodiment may perform the following steps S210 to S230 to automatically generate metadata. In this embodiment, the processor 110 may obtain the original data, and execute the data acquisition module 130, the data analysis module 140 and the data adjustment module 150. In step S210, the data acquisition module 130 may perform data acquisition on the original data, and obtain the first data. In this embodiment, the original data may be in the form of a chart, for example. The processor 110 may acquire a part of the original data according to the acquisition range to obtain the first data, and the acquisition range may be preset by the system or selected by a personnel. In step S220, the data analysis module 140 may analyze the first data and generate second data. In this embodiment, the data analysis module 140 may analyze multiple rows or multiple columns of the first data, respectively, to generate multiple field information of the second data, and multiple pattern information and multiple form information and multiple length information corresponding to the multiple field information. In step S230, the data analysis module 140 may perform sample comparison (pattern comparison) on the second data to generate metadata. In this embodiment, the pattern database 200 may be used to store a plurality of pattern reference information corresponding to different data standards, and a plurality of form reference information, a plurality of length reference information, a plurality of type definition reference information, and a plurality of suggested name reference information corresponding to the plurality of pattern reference information. The data analysis module 140 may read the pattern database 200 to compare the second data according to the aforementioned reference data, so as to automatically determine the information content in the second data that conforms to the data standard, and automatically assemble to generate metadata. In this way, the metadata generating system 100 of this embodiment may efficiently and automatically generate metadata.

Figure 3:
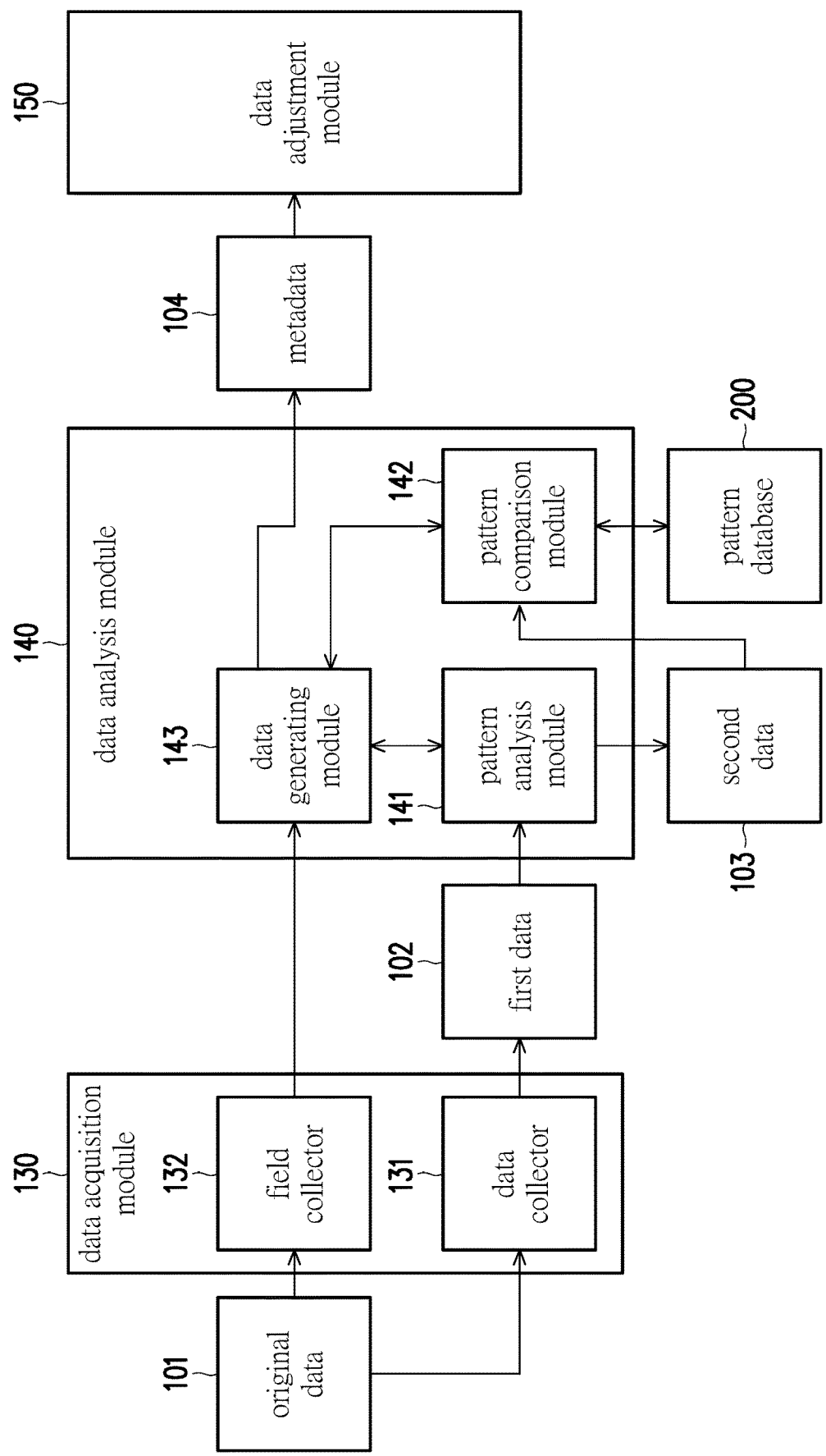
FIG. 3 is a schematic view of generating metadata according to an embodiment of the present disclosure.

FIG. 3 is a schematic view of generating metadata according to an embodiment of the present disclosure. Referring to FIG. 1 and FIG. 3, this embodiment further specifically describes the process of generating metadata. In this embodiment, the data acquisition module 130 may include a data collector 131 and a field collector 132. The data collector 131 may obtain the first data 102 from the original data 101, and the field collector 132 may obtain field information for generating metadata from the original data 101. For example, the data collector 131 may collect a part of the original data 101 according to the acquisition range to obtain the first data 102. The original data 101 may, for example, be in tabular form. The original data 101 may be as shown in Table 1 below, and the first data 102 may be as shown in Table 2 below. The first data 102 is part of the original data 101.

TABLE 1

| Name  | Position | E-mail            | Phone No.    | Age | Gender | Mobile Phone No. |
|-------|----------|-------------------|--------------|-----|--------|------------------|
| Ammy  | Sales    | AmmyLin@house.com | 02-21124654  | 25  | Female | 0999-65432118    |
| Roger | Engineer | RogerLee@fisic.com| 03-45635124  | 29  | Male   | 0998-87154144    |
| Jeff  | Manager  | JeffWu@kingd.com  | 02-45648111  | 37  | Male   | 0870-12377987    |
| Tony  | Sales    | TonyChen@gmail.com| 07-06466811  | 33  | Male   | 0683-44617135    |
| Ann   | Presale  | AnnHu@yahoo.com   | 04-45681234  | 40  | Female | 0897-12347712    |

TABLE 2

| Ammy  | Sales    | AmmyLin@house.com  | 02-21124654 | 25 | Female |
| Roger | Engineer | RogerLee@fisic.com | 03-45635124 | 29 | Male   |
| Jeff  | Manager  | JeffWu@kingd.com   | 02-45648111 | 37 | Male   |
| Tony  | Sales    | TonyChen@gmail.com | 07-06466811 | 33 | Male   |
| Ann   | Presale  | AnnHu@yahoo.com    | 04-45681234 | 40 | Female |

In this embodiment, the data analysis module 140 may include a pattern analysis module 141, a pattern comparison module 142 and a data generating module 143. Next, the pattern analysis module 141 may obtain the first data 102 and analyze the first data 102 to generate the second data 103. The pattern analysis module 141 may calculate a data pattern, and may, for example, determine that the pattern is more than 50% or the highest matching pattern among multiple pieces of similar data. The second data 103 may include a plurality of field information and a plurality of pattern information, a plurality of form information, and a plurality of length information corresponding to the plurality of field information. For example, the second data 103 may be as shown in Table 3 below, and the information content of the pattern information is represented in the form of an industry-standard regular expression (RE) syntax, but the present disclosure is not limited thereto.

TABLE 3

| Field   | Pattern                                        | Form   | Length |
|---------|------------------------------------------------|--------|--------|
| Field 1 |                                                | String | max-20 |
| Field 2 |                                                | String | max-9  |
| Field 3 | ^[a-zA-Z0-9_-]+@[a-zA-Z0-9_-]+(\.[a-zA-Z0-9_-]+)+$ | String | max-46 |
| Field 4 | ^[0-9_-]+-[0-9_]+)+$                           | number |        |
| Field 5 |                                                | String | max-1  |
| Field 6 |                                                | number |        |

Next, the pattern comparison module 142 may compare the second data 103 through the pattern database 200. The pattern comparison module 142 may update the second data 103 according to the comparison result. The pattern database 200 may store a plurality of pattern reference information corresponding to different data standards and a plurality of form reference information, a plurality of length reference information, a plurality of type definition reference information, and a plurality of suggested name information corresponding to the plurality of pattern reference information. For example, the pattern database 200 may store reference information content such as Table 4 below. The pattern comparison module 142 may compare all possible data types of each pattern in the pattern database 200, and set the matched data type in the comparison as a candidate. Moreover, if there is no matched pattern, the pattern comparison module 142 performs format setting processing according to the data content.

TABLE 4

| Pattern | Form | Length | Type definition | Suggested name |
|---|---|---|---|---|
| ^[a-zA-Z0-9_-]+@[a-zA-Z0-9_-]+(\.[a-zA-Z0-9_-]+)+$ | String | 250 | e-mail | Email address |
| ^[0-9_-]+-[0-9_]+)+$ | string | 19 | telephone | Local phone No. |

Next, the field collector 132 may obtain the field information for generating the metadata 104 from the original data 101 and provide the field information to the data generating module 143. The field information may be, for example, the fields "Name", "Position", "Email", "Phone No.", "Gender", "Age" in Table 1, and is used to update (replace) "Field 1", "Field 2", "Field 3", "Field 4", "Field 5", and "Field 6" in the second data 103 of Table 3 in sequence. The data generating module 143 may set a plurality of field information in the updated second data according to the field information to generate the metadata 104. For example, the metadata 104 may be as shown in Table 5 below. It should be noted that, if the pattern reference information includes the information of the suggested name, the data generating module 143 uses the field information of suggested name as the object to be replaced with top priority. Moreover, since there are two types of information patterns and information lengths corresponding to "local phone number" (one is the pattern and length format generated by the pattern analysis result in the second data 103, the other is the pattern and length format pre-stored in the pattern database 200), so the data generating module 143 may first store the data contents of two different information patterns and information lengths in the metadata 104 and mark the data content. The data generating module 143 may mark this non-compliant data, so that the metadata 104 may include marked data that is in non-compliance with standards.

TABLE 5

| Field | Pattern | Form | Length |
|---|---|---|---|
| Name | | String | 20 |
| Position | | String | 9 |
| Email address | ^[a-zA-Z0-9_-]+@[a-zA-Z0-9_-]+(\.[a-zA-Z0-9_-]+)+$ | String | 250 |
| Local phone number | ^[0-9_-]+-[0-9_]+)+$<br>^[0-9_-] | Number | 19<br>13 |
| Gender | | String | 1 |
| Age | | Number | # |

Next, the data adjustment module 150 may output the metadata 104 to a human computer interaction (HCI) interface (or an application programming interface (API)), and the HCI interface may provide an adjustment instruction to the data adjustment module 150 according to the adjustment result of adjusting the metadata. Therefore, the data adjustment module 150 may adjust the marked data in the metadata according to the adjustment instruction to generate adjusted metadata to generate adjusted metadata as shown in Table 6 below. In this regard, the personnel may, for example, select the pattern information and length information in the local telephone number to determine the content of the final metadata. That is to say, the metadata generating system 100 may automatically generate metadata with corresponding data standards, and may also filter discrepancies according to personnel, so as to generate final metadata and publish the final metadata for use by other applications.

TABLE 6

| Field | Pattern | Form | Length |
|---|---|---|---|
| Name | | String | 20 |
| Position | | String | 9 |
| Email address | ^[a-zA-Z0-9_-]+@[a-zA-Z0-9_-]+(\.[a-zA-Z0-9_-]+)+$ | String | 250 |
| Local phone number | ^[0-9_-] | Number | 13 |
| Gender | | String | 1 |
| Age | | Number | # |

To sum up, the metadata generating system and metadata generating method of the present disclosure may effectively improve data processing efficiency, and may generate standardized metadata generating means. The metadata generating system and the metadata generating method of the present disclosure may greatly improve the efficiency for personnel to perform data asset inventory. There is no need for personnel to conduct a comprehensive visual inventory of data, and may find reasonable metadata through the data analysis pattern function of the metadata generating system, and it is only necessary to spend less time dealing with non-compliant data. The metadata generating system and metadata generating method of the present disclosure may achieve a consistent normative processing of common data through the multiplexing of the pattern database, such as the standardizing of ID card numbers, mobile phone numbers or signal card numbers.

Finally, it should be noted that the above embodiments are only used to illustrate the technical solutions of the present disclosure, but not to limit them. Although the present disclosure has been described in detail with reference to the foregoing embodiments, those of ordinary skill in the art should understand that: The technical solutions described in the foregoing embodiments can still be modified, or some or all of the technical features thereof can be equivalently replaced; and these modifications or replacements do not make the essence of the corresponding technical solutions deviate from the scope of technical solutions of the embodiments of the present disclosure.

What is claimed is:

1. A metadata generating system, comprising:
a storage device, which stores a data acquisition module and a data analysis module; and
a processor, coupled to the storage device,
wherein the processor executes the data acquisition module to perform data acquisition on original data and obtain first data, wherein the processor executes the data analysis module to analyze the first data and generate second data,
wherein the data analysis module performs sample comparison on the second data to generate metadata,
wherein the data acquisition module comprises a data collector and a field collector,
the data collector obtains the first data from the original data, and the field collector obtains field information for generating the metadata from the original data,
wherein the first data is a part of the original data, and the field information is another part of the original data,
wherein the data analysis module comprises a pattern analysis module for performing a pattern analysis on the first data and generating the second data,
wherein the second data comprises a plurality of field information and a plurality of pattern information, a plurality of form information and a plurality of length information corresponding to the plurality of field information,
wherein the original data is in a tabular form, and the processor acquires a part of the original data according to an acquisition range to obtain the first data, and the data analysis module analyzes multiple rows or multiple columns of the first data respectively to generate the plurality of field information of the second data and the plurality of pattern information, the plurality of form information and the plurality of length information corresponding to the plurality of field information.

2. The metadata generating system according to claim 1, wherein the data analysis module comprises a pattern comparison module and a data generating module, the pattern comparison module compares the second data through a pattern database, and the data generating module generates the metadata according to a comparison result and the field information.

3. The metadata generating system according to claim 2, wherein the pattern comparison module updates the second data according to the comparison result, and the data generating module sets the plurality of field information in the updated second data according to the field information to generate the metadata.

4. The metadata generating system according to claim 2, wherein the pattern database is provided to store a plurality of pattern reference information corresponding to different data standards, and a plurality of form reference information, a plurality of length reference information, a plurality of type definition reference information, and a plurality of suggested name reference information corresponding to the plurality of pattern reference information.

5. The metadata generating system according to claim 1, wherein the storage device further stores a data adjustment module, wherein the processor executes the data adjustment module so that the data adjustment module adjusts the metadata according to an adjustment instruction.

6. The metadata generating system according to claim 5, wherein the metadata comprises marked data which is in non-compliance with standards, and the data adjustment module adjusts the marked data in the metadata according to the adjustment instruction to generate adjusted metadata.

7. The metadata generating system according to claim 5, wherein the processor outputs the metadata to a human computer interaction interface, and the human computer interaction interface provides the adjustment instruction to the processor according to an adjustment result of the adjusted metadata.

8. A metadata generating method, comprising:
performing data acquisition on original data through a data acquisition module, and obtaining first data;
analyzing the first data through a data analysis module, and generating second data; and
performing sample comparison on the second data through the data analysis module to generate metadata,
wherein the first data is a part of the original data, and field information is another part of the original data,
wherein the second data comprises a plurality of the field information and a plurality of pattern information, a plurality of form information and a plurality of length information corresponding to the plurality of field information,
wherein the original data is in a tabular form,
wherein the step of obtaining the first data comprises:
acquiring the part of the original data according to an acquisition range to obtain the first data; and
wherein the step of generating the second data comprises:
analyzing multiple rows or multiple columns of the first data, respectively, to generate the plurality of field information of the second data, and the plurality of pattern information, the plurality of form information and the plurality of length information corresponding to the plurality of field information.

9. The metadata generating method according to claim 8, wherein the step of generating the second data comprises:
comparing the second data through a pattern database; and
generating the metadata according to a comparison result and the field information.

10. The metadata generating method according to claim 9, wherein the step of generating the second data further comprises:
updating the second data according to the comparison result; and
the step of generating the metadata comprises:
setting the plurality of field information in the updated second data according to the field information to generate the metadata.

11. The metadata generating method according to claim 9, wherein the pattern database is provided to store a plurality of pattern reference information corresponding to different data standards, and a plurality of form reference information, a plurality of length reference information, a plurality of type definition reference information, and a plurality of suggested name reference information corresponding to the plurality of pattern reference information.

12. The metadata generating method according to claim 8, further comprising:
adjusting the metadata according to an adjustment instruction.

13. The metadata generating method according to claim 12, wherein the metadata comprises marked data which is in non-compliance with standards,
wherein the step of adjusting the metadata comprises:
adjusting the marked data in the metadata according to the adjustment instruction to generate the adjusted metadata.

14. The metadata generating method according to claim 12, further comprising:
outputting the metadata to a human computer interaction interface; and
generating the adjustment instruction by the human computer interaction interface according to an adjustment result of the adjusted metadata.

* * * * *